US006475016B1

(12) United States Patent
Heidenreich et al.

(10) Patent No.: US 6,475,016 B1
(45) Date of Patent: Nov. 5, 2002

(54) METHOD AND APPARATUS FOR SECURING ELECTRICAL CONNECTORS

(75) Inventors: Steven E. Heidenreich, Boise, ID (US); Richard G. Sevier, Boise, ID (US); Guenter Schkrohowsky, Boise, ID (US); James L. Dowdy, Eagle, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/626,412

(22) Filed: Jul. 26, 2000

(51) Int. Cl.[7] .............................. H01R 13/627
(52) U.S. Cl. .................. 439/352; 439/64; 439/157; 439/298; 439/377
(58) Field of Search .................. 439/352, 157, 439/160, 64, 377, 298, 328

(56) References Cited

U.S. PATENT DOCUMENTS 5,494,451 A * 2/1996 Bowers ...................... 439/328
6,269,007 B1 * 7/2001 Pongracz et al. ........... 361/759

* cited by examiner

Primary Examiner—P. Austin Bradley
Assistant Examiner—Truc Nguyen

(57) ABSTRACT

Methods and apparatus for securing a first electrical connector mounted to an electronic module to a second electrical connector supported by a support structure, such that the first and second electrical connectors mate in an electrically conductive manner. The support structure can be an electrical board supported by a chassis. The apparatus includes a latch having a first end configured to engage the chassis and a lever portion configured to exert a force on the electronic module when in a first position. This force allows the first electrical connector to be urged towards the second electrical connector. The apparatus also has a compliant member configured to bias the lever portion away from the first position, and a catch configured to secure the latch in the first position.

In the method, a first force is applied to the electronic module to urge the electronic module towards the board from a first position to a second position to thereby cause the first electrical connector to mate in an electrically conductive manner with the second electrical connector. Thereafter a second force is applied to the electronic module to maintain the electronic module in the second position. The second force is selected to be not greater than a predetermined force.

11 Claims, 10 Drawing Sheets

METHOD AND APPARATUS FOR SECURING ELECTRICAL CONNECTORS

FIELD OF THE INVENTION

This invention pertains to methods and apparatus for securely engaging a module, such as a computer component, into a connector which is supported on a chassis or a main board.

BACKGROUND OF THE INVENTION

The present invention is particularly useful in systems such as disk arrays and the like, but can be applied to any situation where it is desired to securely mount a component or module into a connector which is supported on or by a chassis or frame or the like. A disk array is a battery of computer memory disk drives which are mounted together within a cabinet. Disk arrays fit within a category of computer equipment known as "storage systems" because the system is used to store large amount of data. A typical use of a disk array is an Internet server which stores web site information, including content which can be accessed from the web site. It is not uncommon for a disk array to have the capacity to store several terabytes of data (a terabyte being 1000 gigabytes).

A disk array typically consists of a cabinet which houses a plurality of disk drives. The disk drives are mounted by connectors to a board or "plane", which is supported by a chassis, all within the cabinet of the disk array. Depending on the location of the plane within the cabinet, the plane can be known as a "midplane" (mounted towards the middle of the cabinet so that disk drives can be mounted to either side of the plane), or a "back plane" (mounted towards the back of the cabinet so that the disk drives are only mounted to one side of the plane). The chassis can further include framework for supporting the disk drives, and to facilitate orienting the disk drive to the connectors. In this manner a disk drive can be inserted or removed from the array.

The plane further supports electrical conductors for routing power and data to and from the disk drives via the connectors. The electrical conductors are routed to a main connection, allowing a remote computer to store and retrieve data from the disk array. The connectors on the plane can be female connectors which are configured to receive male connector pins on the disk drive. Each disk drive typically has a plurality of such "pins" which mate with the corresponding female connectors on the plane to allow the individual disk drives to send and receive data via the electrical conductors. In other systems, the module can have female connectors, and the panel or board to which the module is being mounted can have corresponding male pins for completing the connection. Although we use the term "pin" to describe the male component of the connector assembly, it is understood that the "pin" can in fact be a blade, a cylinder, a rectangle, or any other protruding geometry which allows it to be inserted into a female receiving connector component.

Turning briefly to FIG. 1A, a side view of a prior art connector 1 is shown in cross section. The connector 1 is mounted on the plane 2. The connector housing 1a defines a cavity 3, in which is located female connectors 4 and 5, which together form a single female connector component. Female connectors 4 and 5 are spring biased towards the center of the cavity 3 such that when a male connector pin 6, which is connected to module 7, is moved in direction "A", the female connectors are pushed apart, but remain biased against the pin 6. Such biasing assures good electrical contact between the connector components.

To maintain the module securely seated in its receptacle within the frame of the disk array, a latch can be provided which secures the module to the chassis or frame. With reference to FIG. 2, a prior art disk array 10 is shown. The disk array comprises a cabinet 11 in which a chassis or frame 12 is disposed. The chassis 12 comprises side rails 23, a top rail 22, and intermediate vertical rails 15 and 17, which when assembled form openings 13 in which a disk drive, such as disk drive 14, can be inserted. The disk drives mate to connectors 1 which are mounted to a plane 25, visible through the openings formed by the chassis members. Disk drive 14 is secured within the opening 13, and is securely seated to connector 1, via the latch 20. Turning now to FIG. 3, a left side sectional view of the upper left opening 13 of the prior art disk array 10 of FIG. 2 is shown. As can be seen, intermediate chassis rail 15 has an anchor point 21 which is configured to be engaged by the latch 20 of FIG. 2.

Turning now to FIG. 4, a perspective view of the disk drive 14 of FIG. 2 is shown in more detail. FIG. 4 depicts the prior art latch 20 and its method of engagement with intermediate chassis rail 15. To secure the disk drive 14 to the midplane (25 of FIG. 3), the far end 29 of the latch 20 is moved in the direction of arrow "B" until handle catch portion 31 engages the disk catch portion 32 to maintain the latch 20 in the secured position. The latch assembly is shown in top view in FIG. 5. The latch 20 of FIG. 5 includes a leveraging edge 30 which engages flange 33, which acts as an anchor point for the latch. As can be seen, when latch 20 engages anchor point 33 and is moved in direction "B", the latch 20 pivots about pivot point 28 and the disk drive 14 is pulled in direction "A" into the opening 13. Latch 20 is moved in direction "B" until the latch is secured by the catch 32. Catch 32 can comprise a spring-release catch having moveable part 34 which moves in direction "C" to allow catch pin 31 on latch 20 to move past the catch pin. The latch is secured in the "locked" position when the catch pin moves back to its biased position. By pulling the latch in the direction opposite to "B" the catch pin is pushed aside, allowing the disk drive to be freed from the anchor point 33.

In designing a connector system for an electronic module, two primary considerations are taken into account. The first is to ensure that the connector pin (6 of FIG. 1A) is sufficiently engaged by the connector contacts 4 and 5. This is necessary for the obvious reason that if no contact is made, data and power cannot be transferred to and from the disk drive. The second consideration is to ensure that excessive force is not applied to the connector system when the connection is made and the module is seated. This is necessary since a force exerted on the midplane can lead to premature failure of the midplane, failure of solder connections, and damage to the connector components. Further, forces exerted on components within the module by the module connectors can lead to failure of these components as well. As shown in FIG. 1A, the first objective of ensuring a connection between the contacts is achieved by designing the connector pins 6 and the contacts 4 and 5 such that there is a reserve wipe distance, $d_{rw}$, i.e., a distance over which the pin 6 travels after it has made initial contact with the connector contacts 4 and 5. The second objective of avoiding an excessive force on the midplane is achieved by designing the connector assembly such that there is a design gap, $d_{dg}$, between the connector housing 1a and the disk drive connector housing 7.

However, in production units the actual wipe distance and the actual gap distance can vary from the design wipe distance and the design gap distance. This variance is due to tolerances in the various components in the chassis, the plane and the module. These tolerances can be due to sheet metal tolerances, printed circuit board (e.g., midplane) tolerances, press-in standoff tolerances, and connector tolerances, to name just a few. The cumulative effect of these tolerances is expressed by the equation $$tol_{sys}=(tol_1^2+tol_2^2+tol_3^2+\ldots +tol_n^2)^{1/2},$$

where $tol_{sys}$ is the cumulative tolerance of the system, and $tol_{1-n}$ represent the various tolerances of the components. If the system tolerance indicates that the actual gap distance might be reduced to zero, then the situation shown in FIG. 1B can occur, wherein the module connector housing 7 butts up against the connector housing 1a. In this instance an undesirable force can be applied to the midplane 2 by a force in the direction "A" exerted by the latch (20 of FIGS. 2 and 4). Likewise, if the system tolerance indicates that the actual wipe distance might be reduced to zero or less, then the pin 6 of FIG. 1A can fail to mate with the connectors 4 and 5, which is obviously undesirable.

One solution to overcome the problem of cumulative tolerances is to reduce the various tolerances which contribute to the overall system tolerance. However, this is not always practical due to machining and fabrication limitations, and can be difficult to implement since components of the system can be manufactured by a variety of different manufacturers. Another solution is to increase the length of the connector pin 6. This will insure that a wipe distance is always achieved while allowing room for a design gap to be maintained. However, this is not practical for two reasons. First, an overly long connector pin can contact the midplane, exerting an undesirable force on the midplane and possibly allowing the connector pin to bend and damage the contacts 4 and 5. Second, the dimensions of many connector components are established by industry standards. These standards are typically a compromise to achieve the best solution to a variety of design considerations. Changing these standards can be a long and arduous process, and can exacerbate the other problems that are addressed by the standard. Further, changing an industry standard will result in incompatible units being present in the field (old standard equipment and new standard equipment), and the cost to change production lines to meet the new standard can be considerable.

What is needed then is a method and apparatus for allowing an electronic module to be securely seated in a connector, such that electrical contact between the connector components is achieved and maintained, while avoiding excessive forces on the connector components and their associated circuit boards.

SUMMARY OF THE INVENTION

The invention includes methods and apparatus for securing a first electrical connector mounted to an electronic module to a second electrical connector supported by a support structure. The support structure can comprise an electrical board supported by a chassis. The invention facilitates mating of the first and second electrical connectors in an electrically conductive manner, while at the same time helping to reduce undue stress on the connector components.

One embodiment of the apparatus includes a latch with a first end configured to engage the support structure, and a lever portion configured to exert a force on the electronic module when the lever portion is in a first "locked" position. This force allows the electrical connector on the module to be urged towards the electrical connector on the electrical board, and mate therewith. The apparatus also has a compliant member configured to bias the lever portion away from the first "locked" position, and a catch configured to secure the latch in the locked position. In this manner, the compliant member applies a biasing force to the latch, which force is transmitted to the module. The biasing force has the effect of reducing the force applied to the connectors by the latch, thereby reducing the risk of overstressing of the connector components.

In one embodiment of the apparatus, the compliant member can comprise a spring disposed between the support structure and the first end of the latch which engages the support structure. In another embodiment the compliant member can be integral with the latch, such that the compliant member comprises a segment of the lever portion of the latch. In this embodiment, the segment of the lever portion of the latch can be fabricated from a resilient material configured to orient the lever portion in a normal position when the lever portion of the latch is unstressed. When the lever portion is moved from the normal position to the first or "locked" position, the resilient segment of the lever portion is stressed to bias the lever portion away from the locked position and towards the normal position. This has the effect of applying the biasing force to the connectors, as described above.

In one embodiment of a method in accordance with the present invention a first force is applied to the electronic module to urge the electronic module towards the support structure from a first position to a second position, to thereby cause the first electrical connector on the module to mate in an electrically conductive manner with the second electrical connector on the support structure. Thereafter a second force is applied to the electronic module to maintain the electronic module in the second, mated, position. The second force is selected to be not greater than a predetermined force, and is preferably selected to be a force which will not cause damage to the first connector, the second connector, or the board. The second force can be produced by applying a biasing force to the module using apparatus in accordance with the present invention. The method can further include providing a compliant member configured to exert the second force on the electronic module when the compliant member is reconfigured from a normal position to a biased position. Further, the method can include providing a catch to hold the compliant member in the second position.

DETAILED DESCRIPTION OF THE INVENTION

Figure 1A:
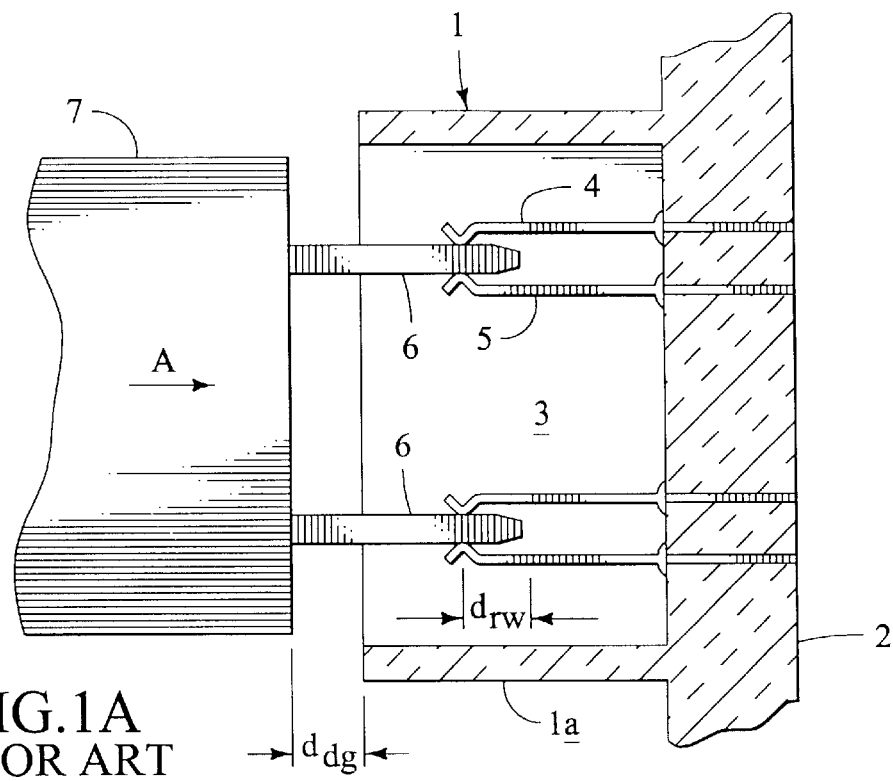
FIG. 1A is a sectional side elevation view of a prior art module and midplane connector assembly.
Figure 1B:
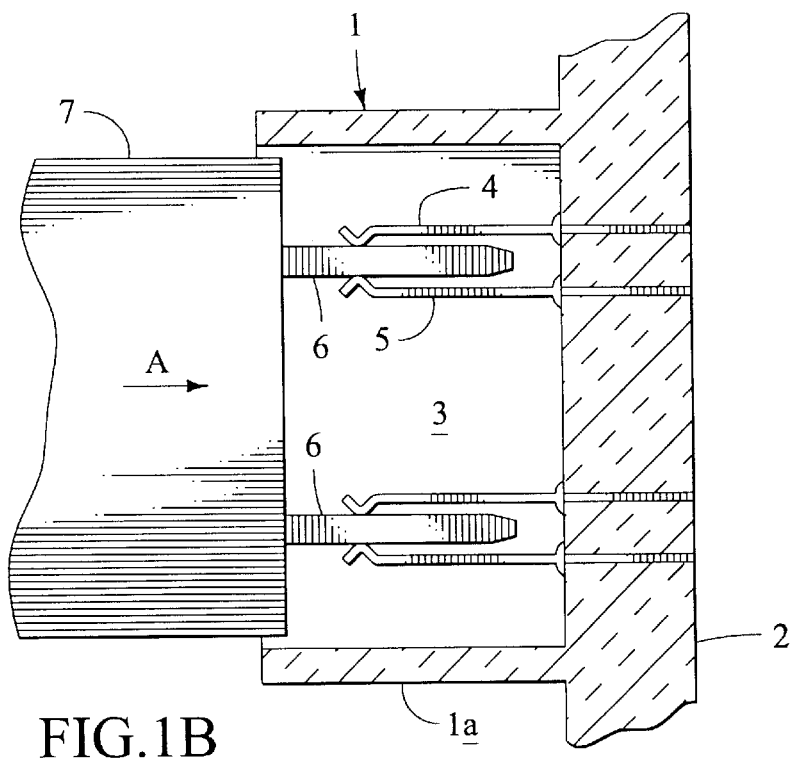
FIG. 1B is a sectional side elevation view of the prior art connector assembly of FIG. 1A showing a zero-gap situation between the module and the midplane connector.

The invention includes methods and apparatus for securing a first electrical connector mounted to an electronic module to a second electrical connector supported by a support structure, such that the first and second electrical connectors mate in an electrically conductive manner without undue stress being applied to the connectors. The support structure can for example be an electrical board supported by a chassis. The methods and apparatus facilitate in keeping the electrical connectors engaged, while also reducing the force on the connectors so that undue force is not applied to the connectors, or to the electrical board via the connectors. The objectives of the invention are achieved by providing a compliant member which acts to buffer the force applied to the electronic module in securing the module connector to the board connector. In essence, the compliant member applies the sustained connector mating force to the electronic module. Excessive forces experienced by the electrical connectors can thus be transferred to the compliant member, causing the compliant member to deform and thus relieve the force on the electrical connectors.

Accordingly, an apparatus in accordance with the present invention can include a compliant member configured to be deformed from a first normal position to a second stressed position. The compliant member has a first portion configured to exert a force on the chassis, and a second portion configured to exert a force on the electronic module when the compliant member is in the stressed position. This force causes the electrical connector on the electronic module to be biased away from the electrical connector mounted on the board. To prevent the electrical connectors from parting, a catch is provided to secure the electronic module in the position established when the compliant member is in the stressed position.

Likewise, a method in accordance with the present invention comprises applying a first force to the electronic module to urge the electronic module towards the support structure from a first position to a second position, to thereby cause the electrical connectors to mate. Thereafter, a second force is applied to the electronic module to maintain the electronic module in the second position where the connectors are mated. The second force is selected to be not greater than a predetermined force which will not cause damage to the first connector, the second connector, or the support structure, and in particular the electrical board.

Although in the following discussion the invention will be described in the setting of securing a disk drive in a disk array, it is understood that the invention is applicable to any situation where it is desirable to secure an electronic module to a support structure. The support structure can comprise a single structure, or a combined structure, such as an electrical board supported on a chassis. Accordingly, the term "electronic module" or "module" should be broadly interpreted, and can include for example, and without limitation, items such as a disk drive, a circuit board, a circuit component, a power supply, and a cable connection (such as a parallel or serial port cable connected to a personal computer). A "circuit board" can include, by way of example only, a printed circuit board ("PCB") containing computer memory chips, a modem, an embedded web server, and a video display card. The common aspect of all of these "modules" is that they have an electrical connector which is configured to mate with another electrical connector. The examples which follow all discuss securing a disk drive in a disk array, but it is understood that the expression "disk drive" can be replaced with the more general term "electronic module".

Likewise, when we describe the module being mounted to an electrical connector supported on an electrical board or a plane, the description should not be considered as limiting. While the description below will be directed towards a disk array having a "plane" to which a plurality of disk drives can be mounted, the invention is not limited to this application. Accordingly, when we say that the module is mounted to an "electrical board", "board", or "plane", we mean that the electrical connector of the module is engaged with a second, compatible electrical connector, and which is typically supported by a surface. An "electrical board" can include a plane (midplane, backplane, etc.) in a disk array, as well as a printed circuit board, or connectors mounted to a frame. The common feature is that the connector to which the module connector is intended to mate is mounted on a supporting structure, and the structure conveys electrical conductors to the electrical connector.

Although the description below is directed towards electrical connectors which connect in the manner shown in FIG. 1A, the invention should not be considered as limited to such. For example, the connection of the two connectors can comprise a soldered connection, rather than the "push-in" type of connection shown. The concerns described above regarding avoiding excessive force on connectors are equally applicable to soldered connections as they are to push-in connections.

Accordingly, notwithstanding the environment in which the invention is set forth below, the invention should be considered broadly, within the scope of the above definitions, as applying to any electronic module which has a first connector part which mates with a second connector part, the second connector part being mounted to an electrical board.

The Apparatus

Figure 2:
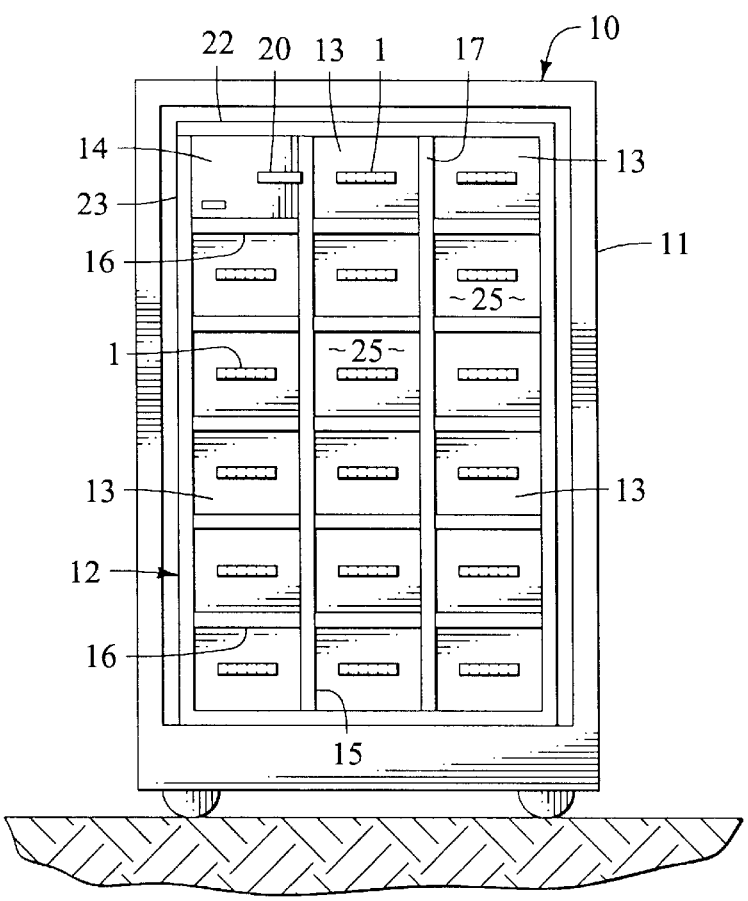
FIG. 2 is a front elevation view of a prior art disk array.
Figure 3:
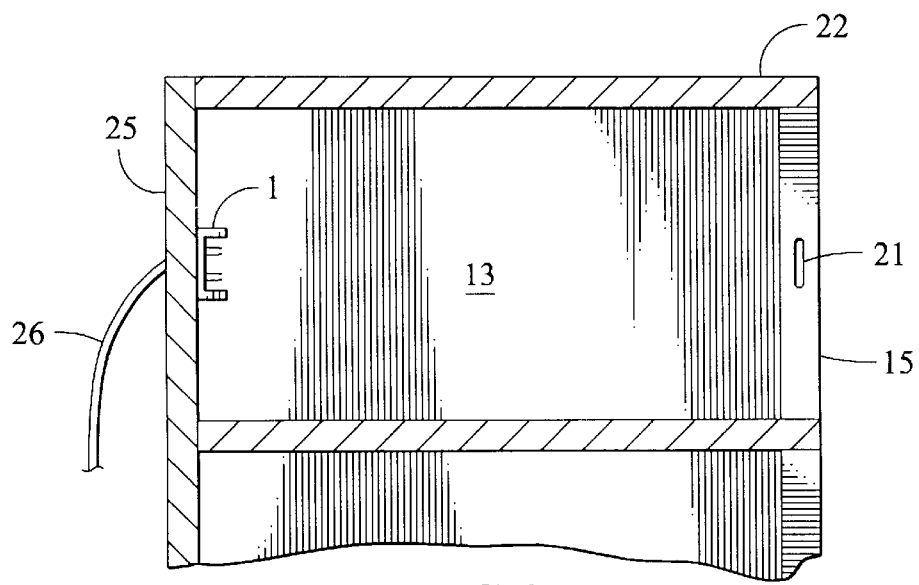
FIG. 3 is a left side sectional detail of the upper left corner of the prior art disk array shown in FIG. 3, showing the housing formed to receive a disk drive.
Figure 4:
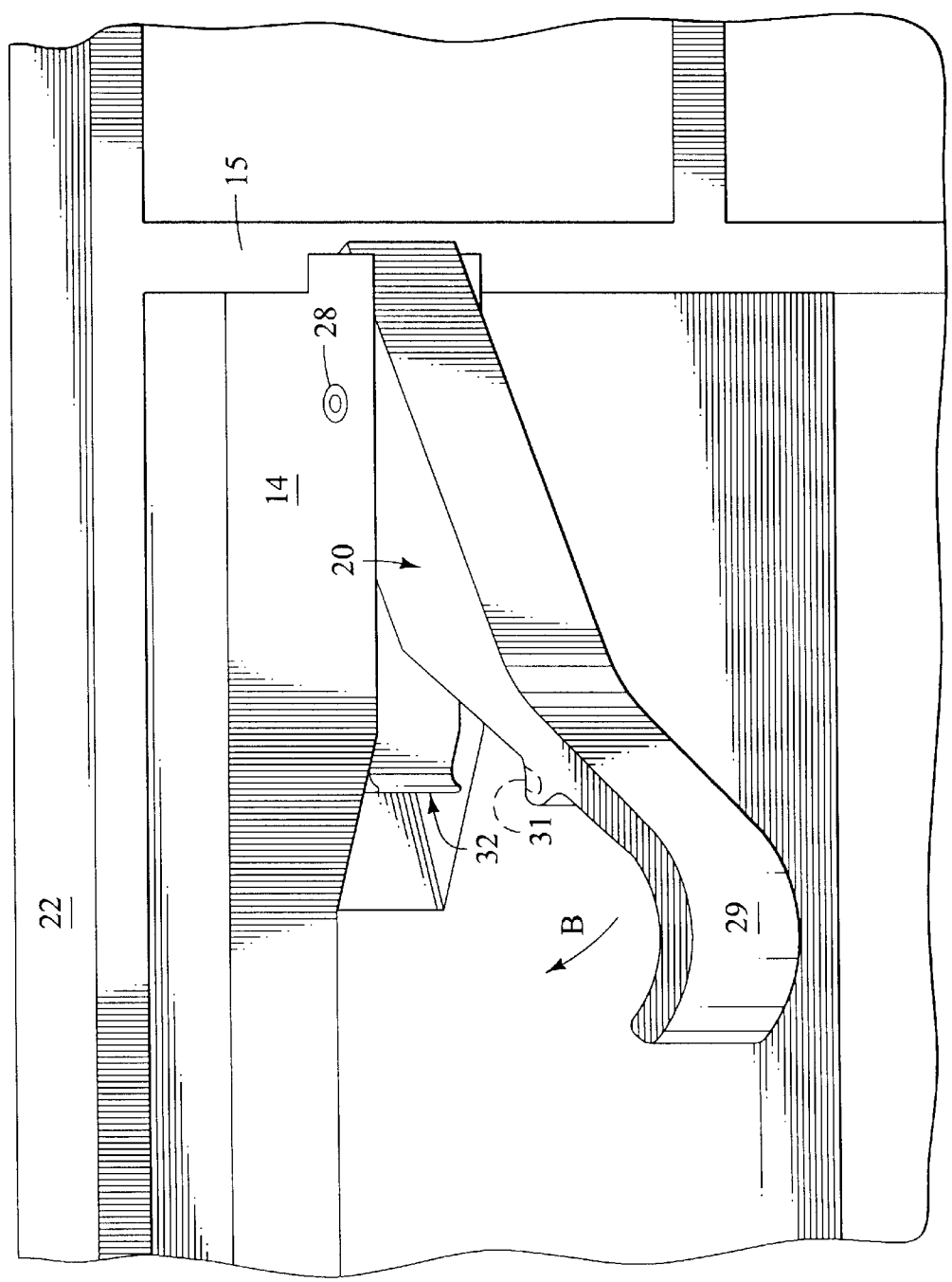
FIG. 4 is a close up perspective of a prior art disk drive mounted in the prior art disk array shown in FIG. 2.
Figure 6A:
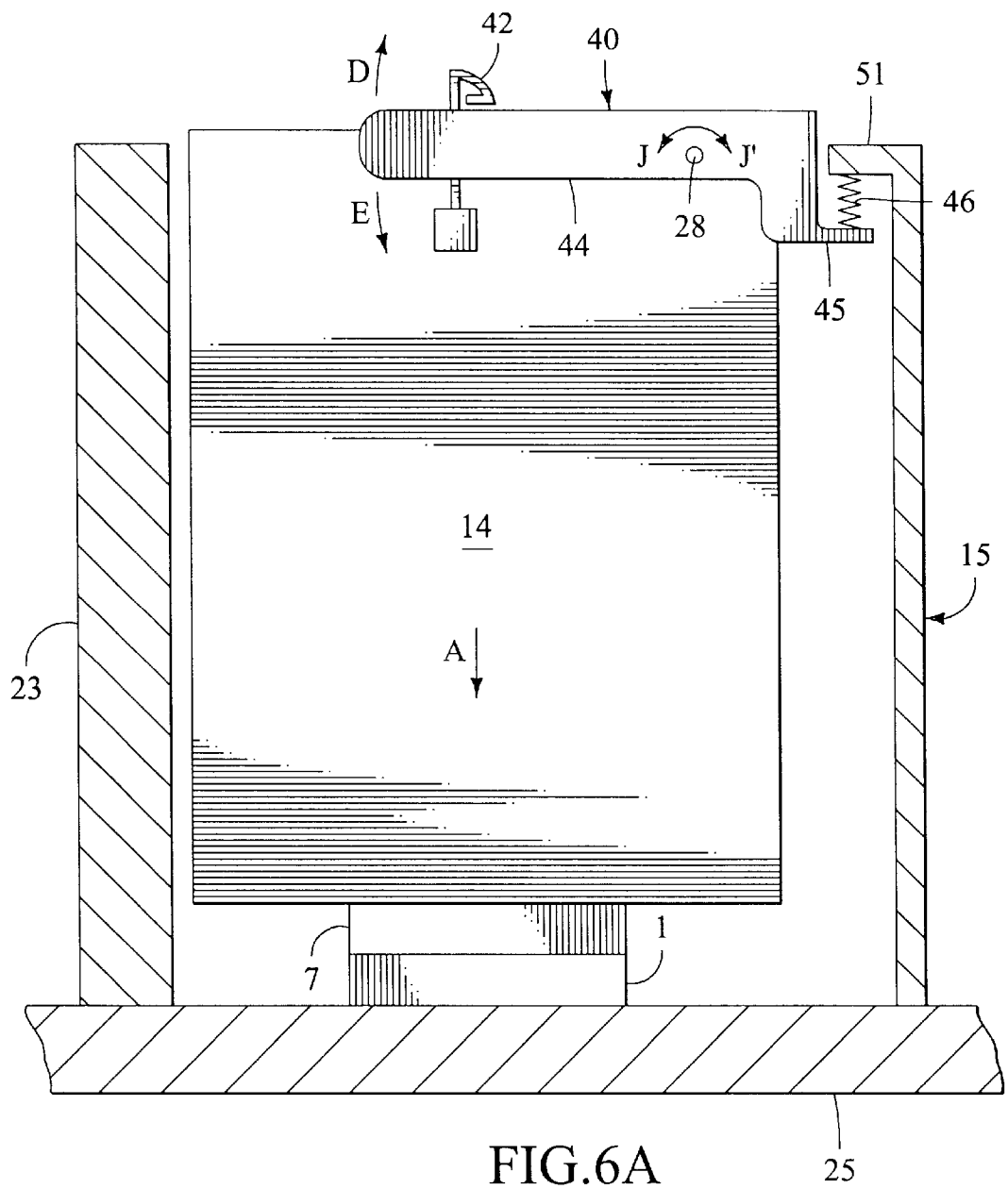
FIG. 6A is a plan view of a compliant latch for securing a module connector to a board connector in accordance with one embodiment of the present invention.

Turning now to FIG. 6A, a first embodiment of an apparatus in accordance with the present invention is shown. FIG. 6A depicts a plan view of an electronic module, shown here as a disk drive 14, which is mounted in a disk array (similar to 10 of FIG. 2). This disk drive 14 has a first electrical connector 7 which is configured to mate with the disk array electrical connector 1. The disk array electrical connector 1 is mounted to an electrical board (a "plane") 25, which conveys electrical conductors providing power and electrical signals to the disk drive 14. The plane is supported by a chassis, which comprises side rail 23 and intermediate rail 15. The disk drive 14 is mounted in the disk array by urging it in direction "A" using a first force until the connectors 7 and 1 mate. Once the disk drive is mounted to the board and the electrical connectors are engaged, the disk drive is secured in place using the latch 40. Latch 40 is configured to be pivotally mounted to the disk drive 14 at pivot point 28, to thereby allow the latch 40 to move in direction "J" or "J'". On one side of the pivot point 28 is a latch handle or lever portion 44 which is moved in direction "E" to the position shown to urge the disk drive connector 7 into the plane connector 1. On the other side of the pivot point 28 the latch 40 has a first end 45 which is configured to engage the chassis at chassis flange 51. However, this engagement is indirect. That is, the first end 45 of the latch does not directly engage the chassis flange 51, but does so indirectly. This indirect engagement is accomplished via a compliant member 46 which is disposed between the first end 45 of the latch and the chassis flange 51.

Figure 6B:
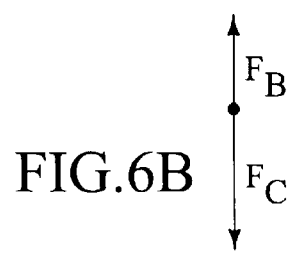
FIG. 6B is a force balance diagram showing how the apparatus depicted in FIG. 6A exerts a biasing force.

As shown, the compliant member 46 comprises a spring positioned to exert equal and opposite forces on the first end 45 of the latch and the chassis flange 51. When the latch 40 is placed in the position shown in FIG. 6A to secure the disk drive 14 to the plane 25, the spring 46 is compressed between the first end 45 of the latch and the flange 51. The spring thus exerts a clockwise moment on the latch 40, biasing the latch handle or lever portion 44 in direction "D". The latch 40, and consequently the disk drive 14, is held in place against this biasing force by catch 42, which is securely affixed to the disk drive. By biasing the latch handle in direction "D", forces which can exist between the disk drive connector 7 and the plane connector 1 are thereby reduced. This is apparent from a simple static force diagram, as shown in FIG. 6B, in which the biasing force $F_B$ imparted to the latch lever 44 by the compliant member 46 reduces the compressive force $F_C$ between the connector parts 7 and 1. As a result, the resultant force exerted on the connectors 1 and 7 is reduced, yet the disk drive 14 is still held in secure position within the disk array, and a sufficient force is still applied between the connectors 7 and 1 to maintain the connectors in electrical contact.

Although the compliant member is shown in FIG. 6A as a metal coil spring, it is understood that it can be any kind of spring. More generally, the compliant member can comprise any device which can be deformed from a first "normal" unstressed (or "at-rest") position to a second, stressed position. By way of example only, the compliant member can be a metal spring, a plastic or polymeric spring, or a resilient material such as rubber or the like. Further, the compliant member can comprise a chamber having a closed hollow center filled with a compressible fluid, such as air. The common criteria for the possible choices for the compliant member is that after being deformed from the normal, unstressed position, the compliant member exerts a restorative force to attempt to return to the normal position. It is this restorative force which is used to bias the disk drive 14 away from the electrical board 25, but which is resisted as a result of the catch 42 in FIG. 6A.

Figure 7:
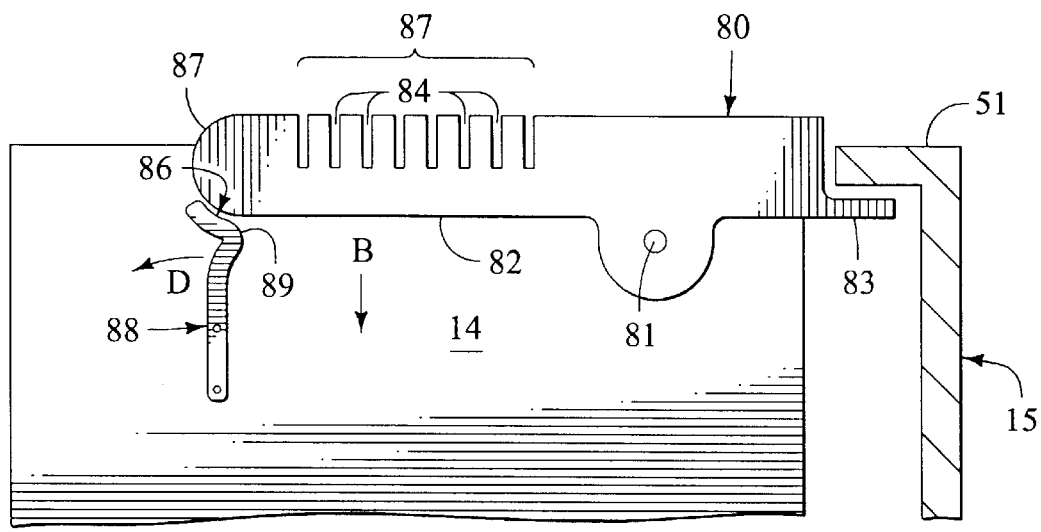
FIG. 7 is a plan view of a compliant latch for securing a module connector to a board connector in accordance with a second embodiment of the present showing the latch in the unlocked position.
Figure 8:
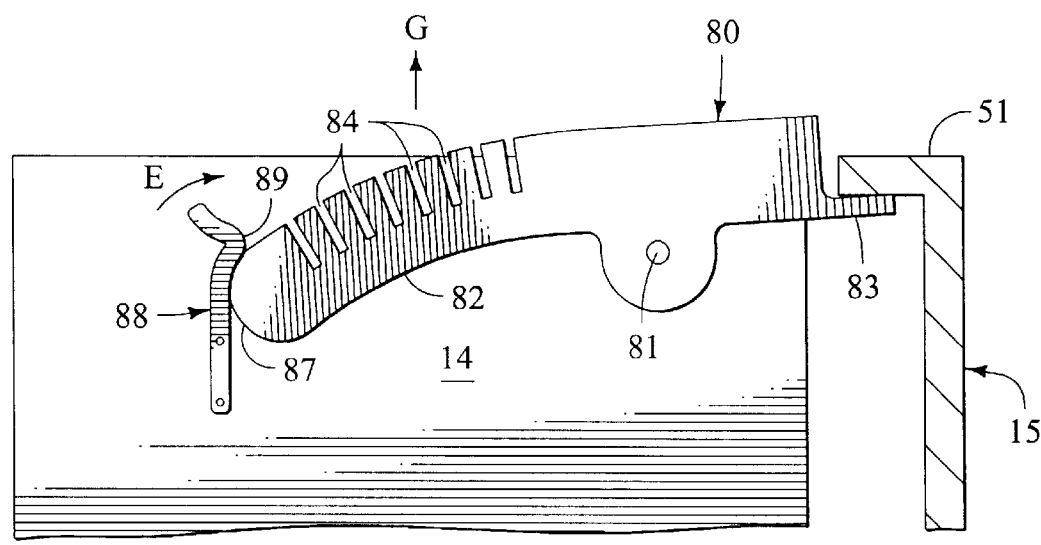
FIG. 8 is a plan view of the compliant latch shown in FIG. 7, showing the latch in the locked position.

A second embodiment of an apparatus in accordance with the present invention is shown in FIGS. 7 and 8. FIG. 7 depicts a top plan view of the apparatus in a partially closed position, and FIG. 8 shows the apparatus shown in FIG. 7, but in the fully "locked" position. For the sake of simplicity, the electrical board and the electrical connectors are not shown in FIGS. 7 and 8, but they can be identical to the board 25 and the connectors 1 and 7 shown in FIG. 6A. With reference to FIG. 7, the apparatus comprises a latch 80 which is configured to be pivotally mounted to a disk drive 14 at a pivot point 81, allowing the latch to rotate in a clockwise and counter-clockwise direction in the view shown. The latch 80 has a first end 83 disposed on a first side of the pivot point 81. The first end 83 is configured to engage the flange 51 of chassis member 15. The latch further comprises a lever portion 82 which is disposed on the other side of the pivot point 81 from the latch first end 83. The lever portion of the latch comprises a segment 87 which acts as the compliant member. In the example shown in FIG. 7, the compliant segment of the latch lever has slots or "kerfs" 84 which are cut into the handle or lever portion 82 of the latch. When the segment 87 is fabricated from a resilient material, such as plastic, then the kerfs allow the lever portion to be bent in a downward direction, as indicated in FIG. 8.

In operation, the lever portion 82 of latch 80 is pushed in the direction "B". In so doing, the first end 83 of the latch engages the chassis flange 51. Since the latch 80 is mounted to the disk drive 14 at the pivot point 81, the engagement of the first end 83 with the flange 51 causes the disk drive to be urged in direction "B", causing the connectors (1 and 7 of FIG. 6A) to mate. As force is applied to the lever portion 82 of the latch 80, the flexible segment 87 bends, allowing the lever portion to move in a direction indicated by arrow "B". A catch 88, which can comprise a piece of spring steel rigidly affixed to the disk drive, moves in direction "D" to allow the tip 87 of the latch 80 to continue moving in direction "B". Once the tip 87 of the latch 80 has passed the bend 89 in the catch 88, the catch moves back in direction "E", as shown in FIG. 8, to secure the lever portion 82 of the latch 80 in the position shown. In this position, the compliant segment 87 of the latch 80 is biased in direction "G", thereby exerting a biasing force on the disk drive 14 via the catch 88. This biasing force reduces the risk of overstressing the connector components 1 and 7 (FIG. 6A). However, the disk drive 14 is held in place by virtue of the catch 88, such that the electrical connectors remain electrically mated notwithstanding the biasing force.

Figure 12:
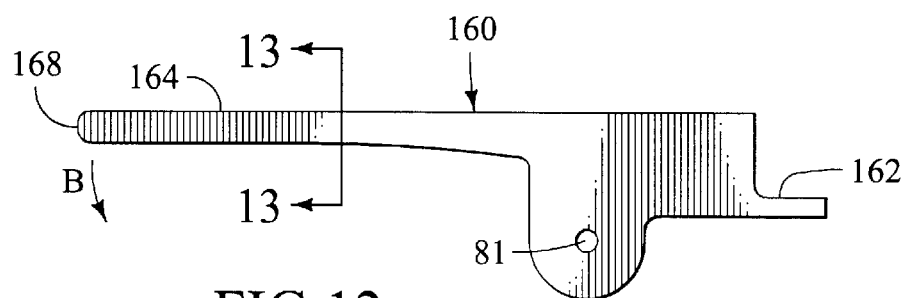
FIG. 12 is a plan view of a compliant latch for securing a module connector to a board connector in accordance with a variation on the second embodiment of the present invention shown in FIGS. 7 and 8.
Figure 13:
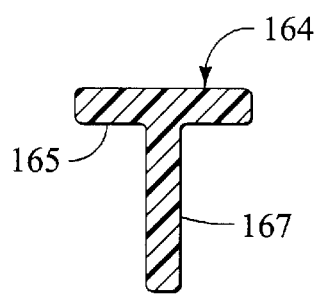
FIG. 13 is a sectional view of the compliant latch shown in FIG. 12.

A variation of the latch 80 of FIGS. 7 and 8 is shown in FIGS. 12 and 13. FIG. 12 depicts a top view of a latch 160 which can be used in the present invention. The latch 160 has a first end 162 for engaging a chassis flange, such as 51 of FIG. 7, and a mounting point 81, allowing the latch 160 to be mounted to a disk drive in a manner similar to that shown in FIG. 7. The latch 160 further comprises a lever portion 164, which acts as the compliant member. A cross section of the lever portion 164 is depicted in FIG. 13. As shown, the lever portion is constructed in the shape of a cantilevered beam, having outer flanges 165, and a central web 167. The lever portion 164 of the latch 160 is preferably constructed from a resilient material, such as plastic, and more preferably has a known modulus of elasticity. Accordingly, the lever portion 164 can be designed such that a known bending angle of the lever portion produces a known moment at the outer end 168 (FIG. 12) of the lever portion when the lever portion is deflected in direction "B" from the normal position shown in FIG. 12. This moment produces the biasing force which is exerted on a catch (such as catch 88 of FIG. 7), which is transmitted to a disk drive to which the latch 160 can be affixed. As described above, the biasing force reduces the risk of the electrical connectors (1 and 7 of FIG. 6A) being overstressed.

It is understood that the cross-section of the lever portion 164 of the compliant latch 160 depicted in FIG. 13 is but one form of a cantilevered beam section which can be used in this embodiment. Other known beam cross sections, such as an "I-beam" section, can also be used. If the modulus of elasticity of the material of construction of the lever portion 164 is known, then once a particular cross-sectional geometry is selected, for a given angular displacement of the lever portion the compliant force can be calculated using known formulae.

Figure 9:
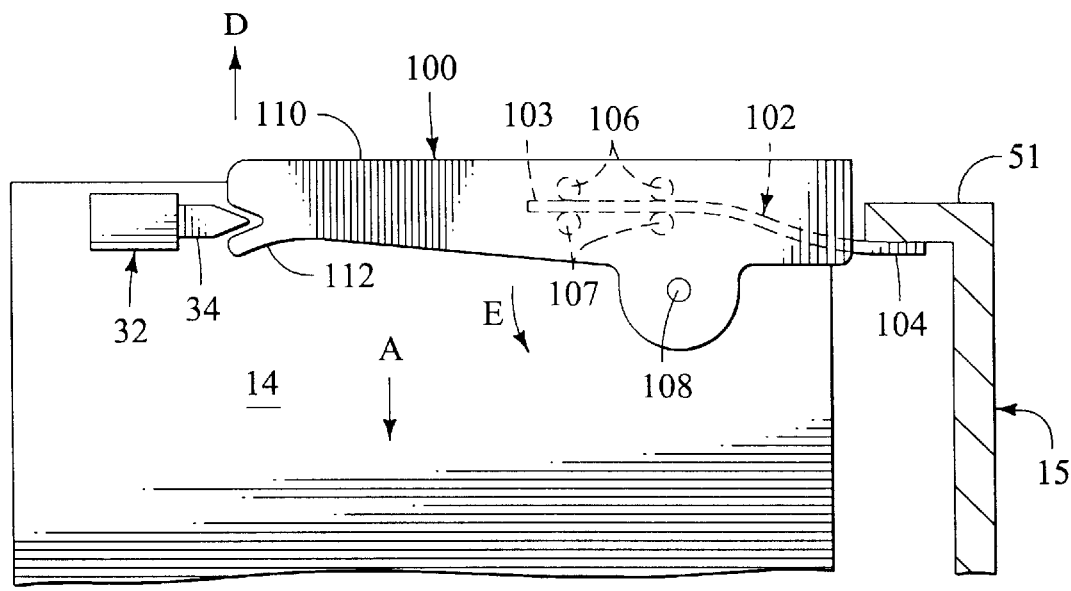
FIG. 9 is a plan view of a compliant latch for securing a module connector to a board connector in accordance with a third embodiment of the present invention.

With reference to FIG. 9, a third embodiment of an apparatus in accordance with the present invention is shown. FIG. 9 depicts a top plan view of the apparatus in a fully closed or "locked" position. For the sake of simplicity, the electrical board and the electrical connectors are not shown in FIG. 9, but they can be identical to the board 25 and the connectors 1 and 7 shown in FIG. 6A. With reference to FIG. 9, the apparatus comprises a latch 100 which is configured to be pivotally mounted to a disk drive 14 at pivot point 108, allowing the latch to rotate in a clockwise and counterclockwise direction in the view shown. The latch further comprises a compliant member 102, which can be disposed within a hollow chamber (not shown) formed within the latch 100. The compliant member 102 can be held in place in the hollow chamber at a first end 103 of the member by pins 106 and 107, which extend inwardly into the chamber. By way of example only, the compliant member can comprise a flat spring, such as a spring made from a piece of flat spring steel, or a resilient plastic material. The compliant member 102 can also be made from a piece of metal spring wire. The compliant member has a second end 104 which is disposed on one side of the pivot point 108, and which acts as the first end of the latch 100 for purposes of engaging the flange 51 of chassis member 15. Disposed on the other side of the pivot point from the compliant member second end 104 is the latch lever portion 110. The outer end of the lever portion 110 is provided with a tongue 112 which allows the latch to be secured in the position shown by catch 32. Catch 32 can operate in the same manner as the prior art catch 32, shown in FIG. 5 and described above.

When latch 100 of FIG. 9 is moved to the "locked" position, as shown in the figure, the second end 104 of the complaint member 102 engages the chassis flange 15, causing the disk drive 14 to be urged in direction "A" by virtue of the forces exerted on the disk drive by the latch 100 at the pivot point 108. The disk drive consequently moves in direction "A" until the connectors (1 and 7 of FIG. 6A) are electrically mated. When the disk drive is seated and the latch 100 is in the "locked" position shown, the first end 103 of the compliant member 102 is deflected in the direction indicated by arrow "E" from a normal position to a stressed position. The outer end of the latch lever portion 110 is then held in position by catch 32. As a result of this deflection of the compliant member, a biasing force is exerted on the catch pin 34 in the direction "D". Since the catch 32 is securely mounted to the disk drive 14, the biasing force is thereby imparted to the disk drive, thereby reducing the force exerted on the connectors 1 and 7. Thus, the biasing force reduces the risk of overstressing the connector components 1 and 7 (FIG. 6A), while still allowing the disk drive 14 to be held in place by virtue of the catch 32, such that the electrical connectors remain electrically mated.

Figure 10:
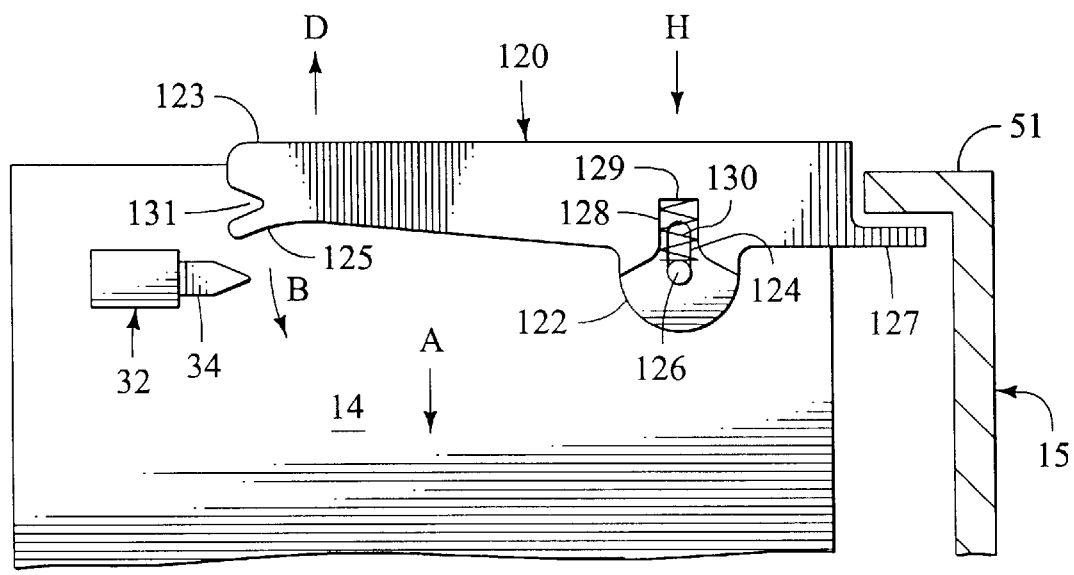
FIG. 10 is a plan view of a compliant latch for securing a module connector to a board connector in accordance with a fourth embodiment of the present invention.

In FIG. 10 a fourth embodiment of an apparatus in accordance with the present invention is shown. FIG. 10 depicts a top plan view of the apparatus in an "unlocked" position. For the sake of simplicity, the electrical board and the electrical connectors are not shown in FIG. 10, but they can be identical to the board 25 and the connectors 1 and 7 shown in FIG. 6A. With reference to FIG. 10, the apparatus comprises a latch 120 which defines a mounting slot 124. The mounting slot is configured to receive a mounting pin 126 which is affixed to the disk drive 14. The slot is disposed within a receiving chamber 128 in the latch 120. The receiving chamber 128 is configured to receive a compliant member 130, such that the compliant member 130 is held in position between a closed end 129 of the receiving chamber 128 and the mounting pin 126. In this manner, the latch 120 is free to move within the slot in the direction indicated by arrow "H", as well as pivot in a clockwise or counterclockwise direction in the view shown. Although the compliant member 130 is shown as a coiled spring, it is understood that the compliant member can comprise any compressible, resilient component which can fit within the chamber 128 and be compressed between the chamber upper end 129 and the mounting pin 126, to thereby exert a biasing force on the latch 120.

The latch 120 further comprises a first end 127 which is disposed on one side of the slot 124. The latch first end 127 is configured to engage the flange 51 of the chassis member 15, such that the disk drive 14 can be urged forward in direction "A" by the latch 120. The latch also includes a lever portion 123 which is disposed on the opposite side of the slot 124 as the first end 127. The outer end of the lever portion 123 of the latch 120 can comprise a tongue 125 and groove 131 which are configured to receive a securing pin 34 of a catch 32, which is mounted to the disk drive 14. The method of operation of the catch 32 has been described above, and will not be further described with respect to FIG. 10.

In operation, when the lever portion of the latch is moved in direction "B", the first end 127 of the latch engages the flange 51 of the chassis member 15. The force applied to the first end 127 of the latch by the flange 51 is imparted to the compliant member 130 by the upper end 129 of the chamber 128. This causes the compliant member to compress, exerting a force on the mounting pin 126, which force urges the disk drive 14 in the direction "A" until the electrical connectors (not shown) have electrically mated and are seated. The latch lever portion 123 continues to move in direction "B" until the groove 131 in the outer end of the latch 120 is engaged by catch pin 34 in a manner similar to that shown in FIG. 9. Thereafter, the moving force is removed from the latch lever portion 123, and the latch 120 remains in the secured or locked position. In the locked position, the compliant member 130 exerts a biasing force on the latch 120, resulting in a force on the catch pin 34 in the direction shown by arrow "D", which is imparted to the disk drive 14 and the electrical connector 7 (FIG. 6A). As described above, this resulting force reduces the risk of overstressing the connector components 1 and 7 (FIG. 6A), while still allowing the disk drive 14 to be held in place by virtue of the catch 32, such that the electrical connectors remain electrically mated.

Figure 11:
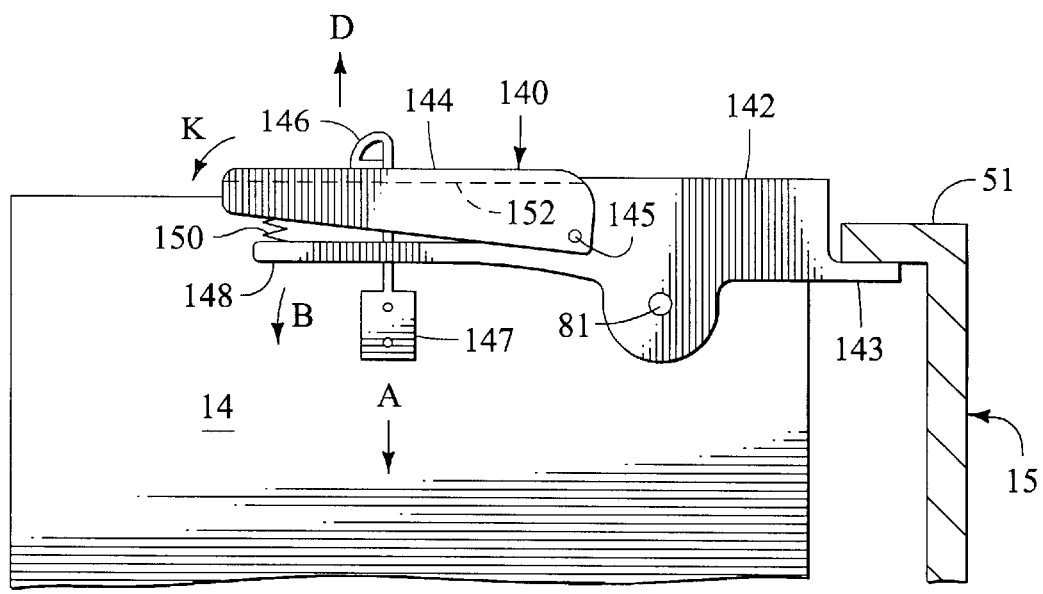
FIG. 11 is a plan view of a compliant latch for securing a module connector to a board connector in accordance with a fifth embodiment of the present invention.

Turning now to FIG. 11, a fifth embodiment of an apparatus in accordance with the present invention is shown. FIG. 11 depicts a top plan view of the apparatus in a secured or "locked" position. For the sake of simplicity, the electrical board and the electrical connectors are not shown in FIG. 11, but they can be identical to the board 25 and the connectors 1 and 7 shown in FIG. 6A. With reference to FIG. 11, the apparatus comprises a latch 140 which is configured to be pivotally mounted to a disk drive 14 at pivot point 81, allowing the latch to rotate in a clockwise and counterclockwise direction in the view shown. The latch comprises a first end 143 disposed on a first side of the pivot point 81. The first end 143 is configured to engage the flange 51 of chassis member 15 when the latch is moved in direction "B", to thereby urge the disk drive in direction "A". The latch further comprises a lever portion 148 which is disposed on the other side of the pivot point 81 as the latch first end 143. The latch 140 is further provided with a locking handle 144, which is pivotally mounted to the latch 140 at handle pivot 145. Disposed between the locking handle 144 and the lever portion 148 of the latch is a compliant member 150 which is held in place by an inner surface 152 of the locking handle. Although the compliant member 150 is shown as a coiled spring, it is understood that the compliant member can comprise any compressible, resilient component which can fit between the locking handle inner surface 152 and the lever portion 148 of the latch, and can be compressed therebetween to thereby exert a biasing force on the latch 140. The latch locking handle 144, and consequently the latch 140, can be held in a "locked" position (as shown) by catch 146, which is securely affixed to the disk drive 14.

In operation, the locking handle 144 is moved in the direction shown by arrow "K", which causes the compliant member 150 to begin to compress and exert a force on the lever portion 148 of the latch 140. This force causes the latch to rotate counterclockwise about the pivot point 81 until the latch first end 143 engages the chassis flange 51. When the latch first end is thus engaged with the flange 51, the locking handle exerts a force on the latch 140 at the handle pivot point 145, which force is transferred to the disk drive 14 at the latch pivot point 81. This force urges the disk drive 14 in direction "A", causing the electrical connectors (not shown) to mate. Locking handle 144 continues to move in direction "K" until it is engaged in a "locked" position (as shown) by catch 146. At this point, movement of the locking handle is ceased. In this "locked" position, the compliant member 150 exerts a biasing force against the inner surface 152 of the locking handle. This biasing force is consequently transmitted to the catch 146, and thus to the disk drive 14 and the electrical connector 7 (FIG. 6A). As described above, this biasing force reduces the risk of overstressing the connector components 1 and 7 (FIG. 6A), while still allowing the disk drive 14 to be held in place by virtue of the catch 146, such that the electrical connectors remain electrically mated.

As can be seen by the various embodiments shown in FIGS. 6 through 13, the compliant member does not need to be a separate component, but can comprise an integral part of the latch, as depicted in FIGS. 7 and 12. Likewise, the first end of the latch can be formed integrally with the lever portion of the latch as shown in FIGS. 6, 7, 10 and 11, or it can comprise a portion of the compliant member as shown in FIG. 9.

Figure 14:
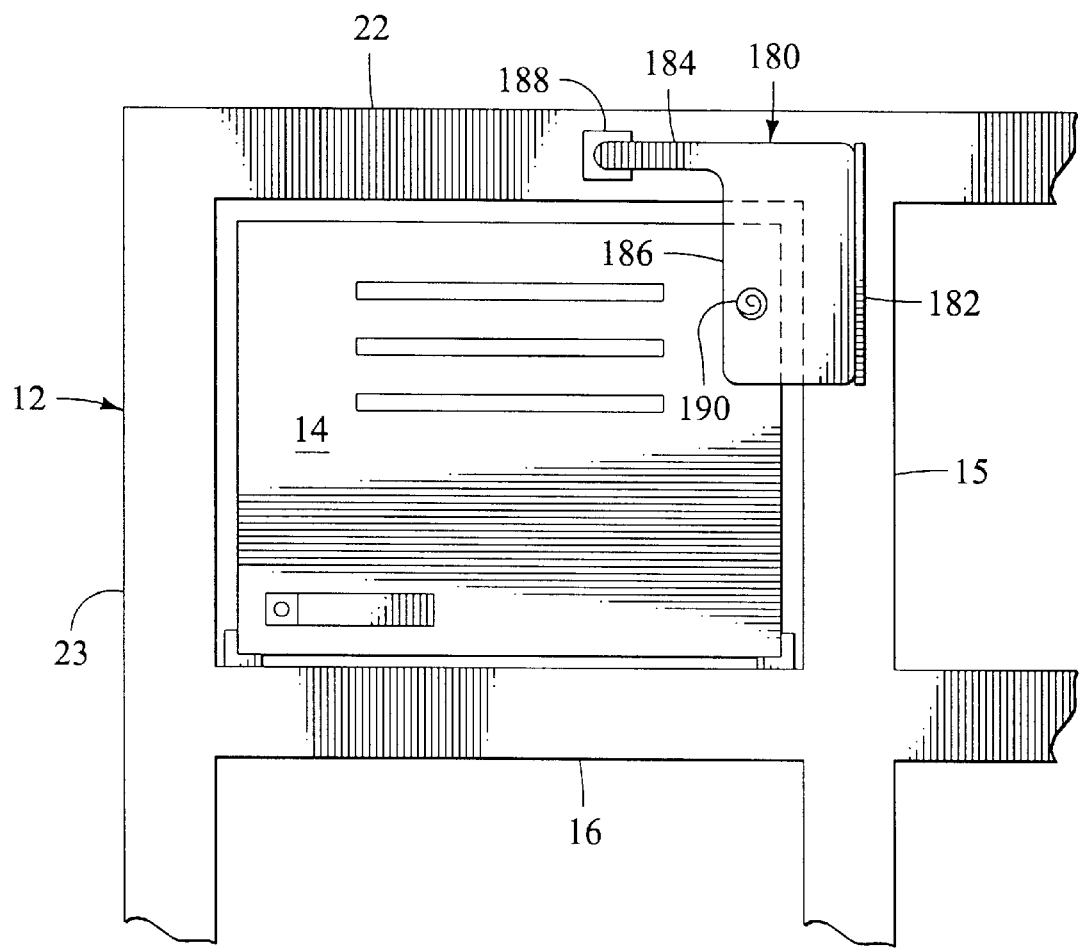
FIG. 14 is a front elevation view of an upper left corner of a disk array containing a compliant latch for securing a module into a board in accordance with a sixth embodiment of the present invention.

With reference now to FIG. 14, an alternate, sixth embodiment of an apparatus in accordance with the present invention is shown. FIG. 14 depicts a front elevation view of a disk drive 14 mounted in a disk array, similar to that shown in the prior art depicted in FIG. 2. The disk drive 14 is enclosed by a chassis side member 12 on the left, chassis top and bottom members 22 and 16, respectively, and chassis intermediate member 15. It is understood that the disk drive mates to an electrical plane in a manner similar to that shown in the prior art views Figs, 1A and 1B, and in FIG. 6A. Unlike the embodiments of the invention depicted in FIGS. 6 through 11 wherein the latch is pivotally mounted to the disk drive, in the embodiment shown in FIG. 14, the apparatus comprises a latch 180 which is pivotally mounted to the chassis. Accordingly, the latch 180 of FIG. 14 comprises a hinge 182 which acts like a door hinge, to allow the latch 180 to swing "outward" from the position shown in FIG. 14 so that the disk drive 14 can be removed. The latch 180 includes a body portion 186, which acts as the lever portion of the latch to secure the disk drive into the chassis. Disposed between the latch body 186 and the front of the disk drive 14 is a compliant member 190. Although the compliant member 190 is shown as a coiled spring, it is understood that the compliant member can comprise any compressible, resilient component which can fit between the latch body 186 and the disk drive 14, and can be compressed therebetween to thereby exert a biasing force on the latch body 186. The latch 180 can be held in a "locked" position (as shown in the figure) by catch 188, which is securely affixed to the chassis upper member 22.

In operation, as the latch is pivoted about the hinge 182 at its first end using the handle 184, the latch moves from an "unlocked" position (not shown) and towards the disk drive 14. At a certain point during the pivoting of the latch body, the inner surface of the latch body 186, the compliant member 190, and the front face of the disk drive 14 all come into serial contact, at which point force exerted on the latch handle 184 to move it towards the disk drive is transmitted to the disk drive by the compliant member 190. This force urges the disk drive towards the electrical plane (not visible in this view), and consequently the electrical connectors on the disk drive and the electrical plane are urged together to electrically mate. At the end of its travel the latch handle 184 is secured in a "locked" position by catch 188 as shown, and movement of the latch handle ceases. In this "locked" position the disk drive can move "outward" (with respect to the figure) against the compliant member 190 to thereby relieve any excess stress which may be applied to the electrical connectors. However, the latch body 186, as secured by the catch 188, prevents the disk drive from moving outward so far that the electrical connectors become unmated. In this manner a sufficient force can be applied to the disk drive to seat the electrical connectors, while avoiding overstressing of these components.

Figure 15A:
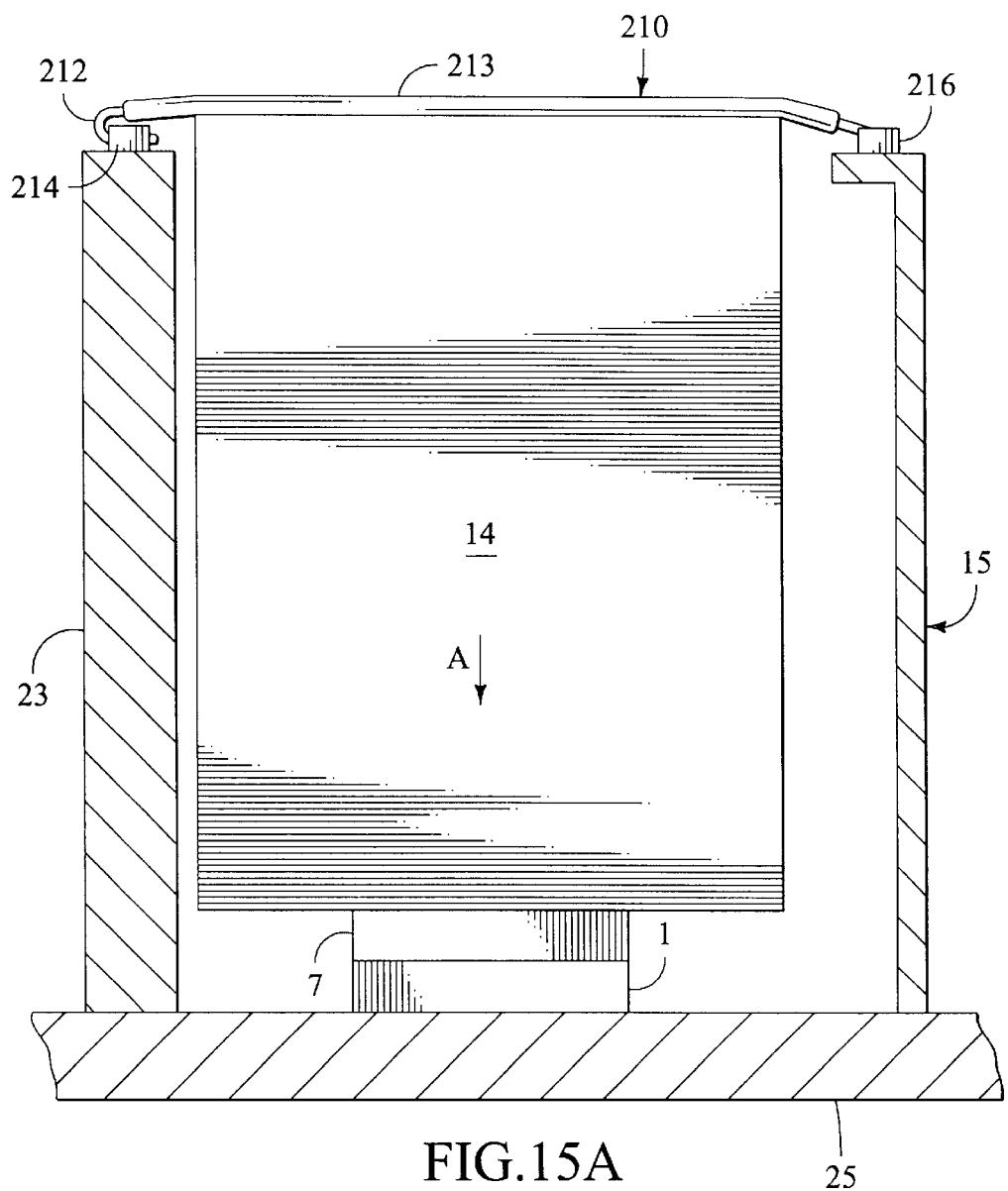
FIG. 15A is a plan view of an seventh embodiment of the present invention using a compliant member to secure a module connector to a board connector.

A seventh embodiment of an apparatus in accordance with the present invention is shown in FIG. 15A. FIG. 15A depicts a plan view of a disk drive 14 having an electrical connector 7 which is mated to a second electrical connector 1. Electrical connector 1 is mounted to an electrical board or plane 25. Chassis members 23 and 15 aid in supporting the disk drive and the board 25. Unlike the previous embodiments of the invention described above, the apparatus shown in FIG. 15A does not comprise a traditional "latch". However, it is proper to consider the apparatus shown in FIG. 15A as comprising a latch, as will be more fully described below.

The apparatus shown in FIG. 15A comprises a "latch" 210 which is anchored at a first end 212 to chassis side member 23, and at a second end 216 to chassis side member 15. Preferably, the "latch" 210 is removably attached to the chassis at one or both of ends 212 and 216. For example, "latch" end 212 can comprise a hook device, as shown, which can be engaged in anchor 214, which defines a hole for receiving the hook. The "latch" can be pivotally anchored to the chassis at the second end 216, thereby providing the "latch" with an end 216 which engages the chassis. When the "latch" 210 is positioned as shown, it passes over the front or face of the disk drive 14. The "latch" comprises a compliant member 213, which is secured between the first end 212 and the second end 216 of the "latch". The compliant member 213 is configured to be longitudinally deformed in a resilient manner in response to a force being applied to the first end 212 and the second end 216 of the "latch". The compliant member 213 can be an elastomeric cord (similar to a Bungee® cord), or a plastic strap or the like.

Figure 15B:
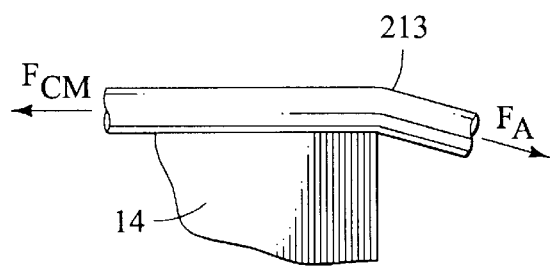
FIG. 15B is a detail of a corner of the disk drive and the compliant member of FIG. 15A.
Figure 15C:
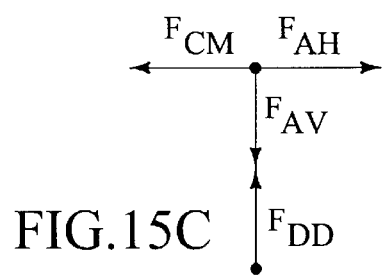
FIG. 15C is a force balance diagram showing how the apparatus depicted in FIG. 15A exerts a biasing force.

In order to secure the ends 212 and 216 of the "latch" 210 to the chassis across the face of the disk drive 14, the compliant member 213 is configured to be elongated by a predetermined amount to allow ends 212 and 216 to engage anchors on the chassis. This elongation produces longitudinal force within the complaint member. However, as a result of the face of the disk drive 14 protruding beyond the anchor points 212 and 216 of the "latch" 210, a biasing force is produced. With reference to FIG. 15B, a detail of the upper right corner of the disk drive 14 of FIG. 15A is depicted, showing how the complaint member 213 is stretched over the corner of the disk drive. As a result of elongation within the compliant member, a longitudinal force $F_{CM}$ develops. This force is transmitted to the anchor point at first end 216, and exerts force $F_A$ on the anchor point. However, as can be seen, force $F_A$ is not in alignment with force $F_{CM}$, and therefore a vertical force component develops. This is illustrated in the force balance diagram of FIG. 15C. As seen, force $F_A$ is resolved into a horizontal component $F_{AH}$, and a vertical component $F_{AV}$. Force vector $F_{AH}$ is balanced by the equal and opposite force $F_{CM}$. However, to achieve a static solution, force component $F_{AV}$ must also be met by an equal and opposite force. This equal and opposite force is found as the force $F_{DD}$, which is the force exerted on the disk drive 14 by the compliant member 213. This force, $F_{DD}$, is the force which holds the disk drive electrical connector 7 into contact with the plane connector 1. However, due to the complaint nature of the compliant member 213, the compliant member reduces the risk that an excessive force will be applied to the disk drive and electrical connectors.

The Methods

The invention further includes methods for securing an electronic module into a first electrical connector supported by an electrical board, which is supported by a chassis. The electronic module has a second electrical connector configured to mate in an electrically conductive manner with the first electrical connector. As described above, a primary problem with the prior art is that the force used to seat the disk drive connector to the board connector is typically maintained even after the components have been mated. It is therefore desirable to reduce the force on the connectors after they have been mated. Accordingly, a first embodiment of a method in accordance with the present invention includes the step of applying a first force to the electronic module to urge the electronic module towards the board from a first position to a second position. This causes the electrical connector mounted to the module to mate in an electrically conductive manner with the electrical connector mounted to the board. After the module connector is seated with the electrical board connector, a second force is applied to the electronic module to maintain the electronic module in the second, mated position. The second force is selected to be not greater than a predetermined force which will cause damage to the module connector, the board connector, or the board itself. Preferably, the second force is selected to be less than the first seating force.

Figure 5:
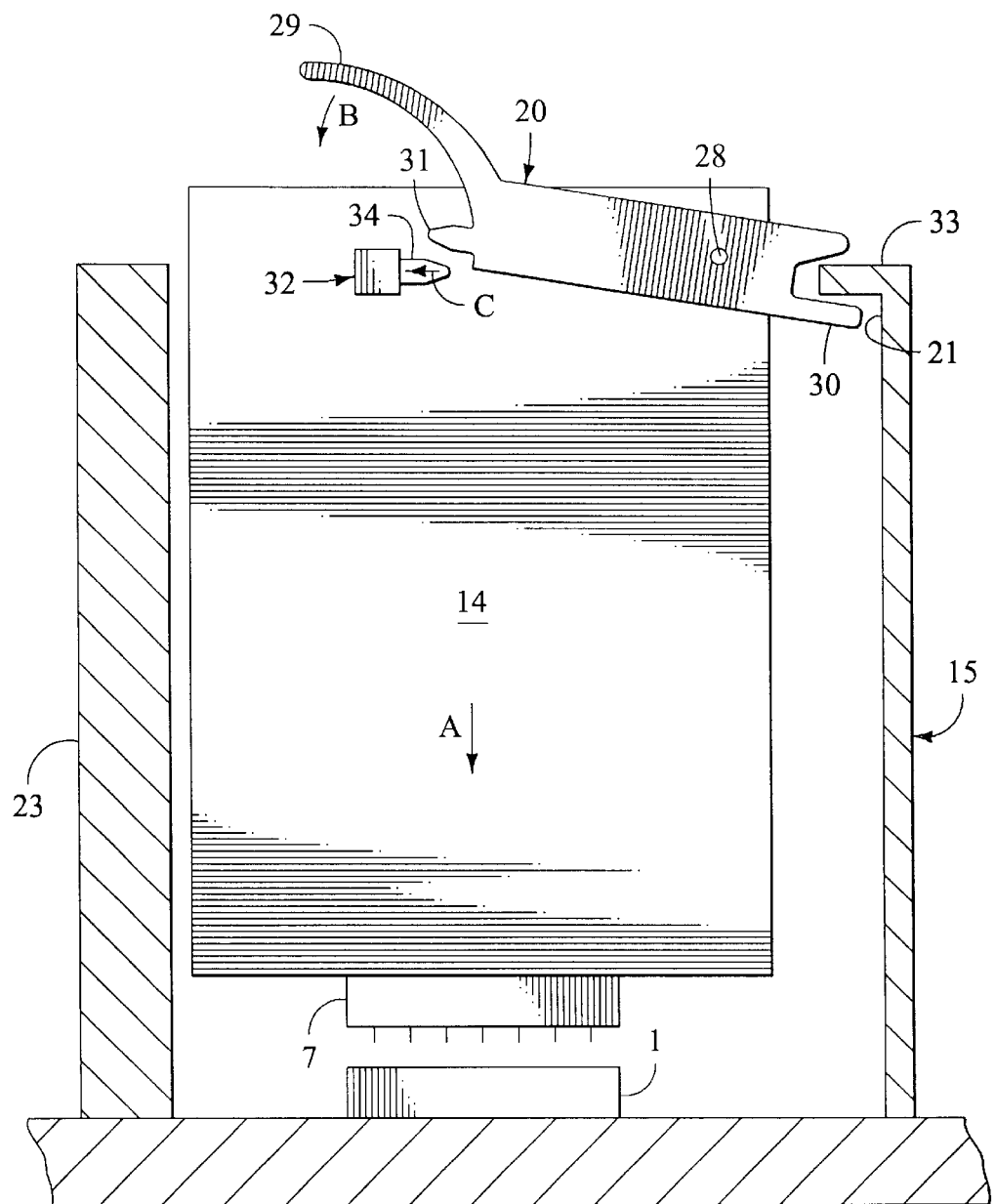
FIG. 5 is a plan view of the prior art module latch shown in FIG. 4.

The second force which is applied to the module after it has been seated against the board can be obtained by applying a biasing force against the device used to apply the first, seating force. For example, if a latch such as latch 20 of FIG. 5 is used to apply the first or "seating" force, then by applying a biasing force against the module or the latch, the force exerted by the latch on the module connector can be reduced. The biasing force can be applied by any of the apparatus described above in FIGS. 6 through 13. Alternately, the second force which is used to hold the disk drive in place can be a resistive force provided by a compliant member configured to exert a known, limited force to the disk drive. Such an apparatus is shown in FIGS. 14 and 15A. The method can also include providing a catch to secure the module in place against the biasing force or the resistive force.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An apparatus for securing a first electrical connector mounted to an electronic module to a second electrical connector supported by a electrical board, such that the first and second electrical connectors mate in an electrically conductive manner, and wherein the electrical board is supported by a chassis, comprising:

a latch having a first end configured to engage the chassis and lever portion configured to exert a force on the electronic module when in a first position to thereby allow the second electrical connector to be urged into the first electrical connector;

a complaint member configured to apply a sustained connector mating force to the electronic module, to bias the lever portion away from the first position, and to deform and thus relieve force on the electrical connectors; and a catch configured to secure the latch in the first position.

2. An apparatus for securing a first electrical connector mounted to an electronic module to a second electrical connector supported by a support structure, such that the first and second electrical connectors mate in an electrically conductive manner, comprising:

a latch having a first end configured to engage the support structure and a lever portion configured to exert a force on the electronic module when in a first position to thereby allow the first electrical connector and the second electrical connector to be urged together;

a compliant member configured to bias the lever portion away from the first position;

a catch configured to secure the latch in the first position; and wherein the compliant member comprises a segment of the lever portion of the latch.

3. The apparatus of claim 2, and wherein the segment of the lever portion of the latch is fabricated from a resilient material configured to orient the lever portion in a normal position when the lever portion of the latch is unstressed, and when the lever portion is moved from the normal position to the first position, the segment of the lever portion is stressed to bias the lever portion away from the first position towards the normal position.

4. The apparatus of claim 3, and wherein the segment of the lever portion of the latch is provided with kerfs to allow the segment of the lever to flex between the normal position and the first position.

5. The apparatus of claim 3, and wherein the segment of the lever portion of the latch is configured to exert a predetermined force in response to a preselected displacement of the segment from the normal position to the first position.

6. An apparatus for securing a first electrical connector mounted to an electronic module to a second electrical connector supported by a support structure, such that the first and second electrical connectors mate in an electrically conductive manner, comprising:

a latch comprising a compliant segment configured to be deformed from a first normal position to a second stressed position, the latch having a first portion configured to exert a force on the support structure, and a second portion configured to exert a force on the electronic module away from the first electrical connector when the latch is in the stressed position.

7. The apparatus of claim 6, and further comprising a catch configured to secure the compliant member in the stressed position.

8. An apparatus for securing a first electrical connector mounted to an electronic module to a second electrical connector supported by a support structure, such that the first and second electrical connectors mate in an electrically conductive manner, comprising:

a compliant member configured to be deformed from a first normal position to a second stressed position, the compliant member having a first portion configured to exert a force on the support structure, and a second portion configured to exert a force on the electronic module away from the first electrical connector when the compliant member is in the stressed position; and wherein the compliant member is a flexible portion of a handle of a latch, the latch having a first end configured to engage the support structure, the latch being pivotally mounted to the electronic module at a point between the first end of the latch and the latch handle.

9. An apparatus for securing a first electrical connector supported on an electronic module to a second electrical connector, comprising a compliant member configured to apply a sustained connector mating force to the electronic module.

10. The apparatus of claim 9, and wherein the compliant member is configured such that the sustained connector mating force is a force which will not cause damage to the first electrical connector or the second electrical connector.

11. The apparatus of claim 9, and further comprising a securing member configured to urge the first electrical connector and the second electrical connector together in an electrically mated manner.

* * * * *